May 29, 1962 C. J. LE BEL 3,037,129

BROAD-BAND LOGARITHMIC TRANSLATING APPARATUS UTILIZING THRESHOLD CAPACITIVE CIRCUIT TO COMPENSATE FOR INHERENT INDUCTANCE OF LOGARITHMIC IMPEDANCE

Filed Oct. 5, 1960 2 Sheets-Sheet 1

INVENTOR
Clarence J. LeBel
BY
Pennie Edmonds Morton Barrows & Taylor
ATTORNEYS

May 29, 1962 C. J. LE BEL 3,037,129
BROAD-BAND LOGARITHMIC TRANSLATING APPARATUS UTILIZING
THRESHOLD CAPACITIVE CIRCUIT TO COMPENSATE FOR
INHERENT INDUCTANCE OF LOGARITHMIC IMPEDANCE
Filed Oct. 5, 1960 2 Sheets-Sheet 2

INVENTOR
Clarence J. Le Bel
BY
Pennie Edmonds Morton Barrows & Taylor
ATTORNEYS

United States Patent Office 3,037,129

Patented May 29, 1962

3,037,129

BROAD-BAND LOGARITHMIC TRANSLATING APPARATUS UTILIZING THRESHOLD CAPACITIVE CIRCUIT TO COMPENSATE FOR INHERENT INDUCTANCE OF LOGARITHMIC IMPEDANCE

Clarence J. Le Bel, 370 Riverside Drive, New York 25, N.Y.

Filed Oct. 5, 1960, Ser. No. 60,696
11 Claims. (Cl. 307—88.5)

The present invention relates to non-linear wave translating apparatus and more particularly to improved electrical wave translating apparatus having a logarithmic transfer characteristic which is accurate over a wide dynamic range of signal amplitudes and signal frequencies.

Translation devices which have an input-output transfer characteristic that obeys a logarithmic law have found wide-spread application over the years, particularly in the field of electro-acoustical measurements and the like. Performance requirements have become increasingly stringent with time, both with respect to amplitude range and frequency range and also with respect to the maximum acceptable departure from the ideal logarithmic transfer characteristic throughout the operating range. Circuits proposed in the prior art have generally been inadequate either in amplitude range, in frequency range or both.

The present invention constitutes an improvement in the applicant's "Circuit With Extended Logarithmic Characteristic," described in U.S. Patent 2,757,281, issued July 31, 1956. The extended range logarithmic circuit described in the above patent, while relatively accurate over a wide amplitude range, has a limited frequency range wherein the output response departs from the desired logarithmic curve for high-amplitude and high-frequency input signals.

It is a principal object of the present invention to provide an improved wave translation circuit which accurrately obeys a logarithmic transfer characteristic over a wide range of signal amplitudes and frequencies.

The extended range logarithmic circuit of the present invention utilizes the non-linear resistance characteristic of a pair of crystal type diodes to achieve the desired transfer characteristic. Since this non-ohmic resistance varies logarithmically as a function of current flow through the crystal, the desired logarithmic transfer characteristic is obtained by connecting the input signal voltage to the crystal diodes through a high resistance and taking the output voltage from across the crystals. As explained in the above-identified patent, the dynamic amplitude range for this logarithmic circuit can be extended by cancelling out the voltage drop across the crystal which is produced as a result of a small undesired linear resistance component in the crystal. The desired cancellation effect is achieved by a forward-feed circuit which supplies an out-of-phase signal component to the output circuit which is of sufficient amplitude to cancel out the in-phase voltage developed across the linear resistance in the crystal.

Experience with the logarithmic circuit described above has indicated that with high amplitude input signal levels the output signal response departs from the desired logarithmic characteristic at higher frequencies. This undesired deviation is particularly noticeable in the frequency range between 20 kc. and 100 kc. where the output level rises above the desired logarithmic characteristic at the high amplitude end of the range.

In accordance with a featured aspect of this invention, a novel non-linear high-frequency compensation circuit is provided to overcome the aforementioned defect. Voltage amplitude sensitive switching devices are provided to connect a compensating capacitor effectively in parallel with both the non-linear logarithmic load impedance and the signal input terminals when high-amplitude input signals are supplied to the circuit.

In a preferred embodiment of the invention, a pair of zener diodes, connected back-to-back are employed to effect the switching operation at high signal levels and a variable capacitor is connected in series with these diodes to provide the desired high-frequency compensation. Since the zener diodes and the logarithmic crystal diodes are all temperature sensitive, these elements are all advantageously placed within a temperature controlled oven. The improved circuit provided by the present invention accurately obeys a logarithmic transfer characteristic with ±½ db over an amplitude range of 50 to 60 db and a frequency range from several cycles per second to 20,000 cycles per second. The circuit is accurate within ±1 db over a 50 to 60 db range from several cycles per second up to 100,000 cycles per second.

The novel features which are believed to be characteristic of the invention, both as to its organization and method of operation, together with further objects and advantages thereof, will be better understood from the following description considered in conjunction with the accompanying drawings, in which.

Figure 1:
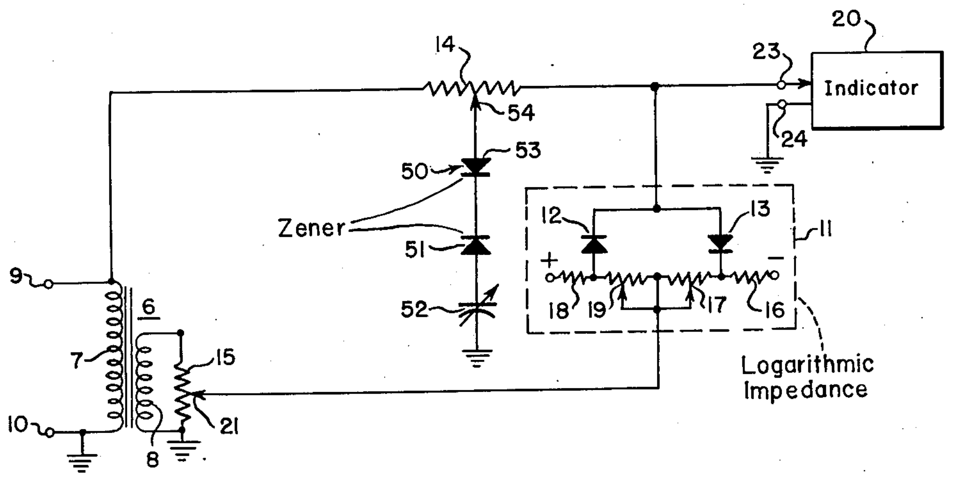
FIG. 1 is a schematic diagram showing a preferred embodiment of the invention wherein a pair of zener diodes are employed in conjunction with a capacitor to effect the desired non-linear high-frequency compensation.

In FIG. 1 there is shown a transformer 6 with primary winding 7, secondary winding 8 and input terminals 9 and 10 which are provided to receive variable-amplitude input signals which vary in frequency from a few cycles per second up to 100 kc., for example. A logarithmic load impedance 11 including diodes 12 and 13 is connected to the input terminals via resistor 14 and potentiometer 15 as shown. Diodes 12 and 13 are preferably of the germanium or silicon type having a voltage-current characteristic defined by the equation $E=K \log I$ where E represents the potential drop across the diode and I represents the current flow therethrough. The diodes are connected in reversed polarities as shown so that one diode conducts current on the positive going excursions of the incoming signal and the other diode conducts current on the negative going excursions of the incoming signal. Where silicon diodes are employed, the log impedance characteristic of the diodes can be extended by biasing both diodes in the direction to cause current flow. Thus the cathode of didoe 13 is biased negatively by a small fraction of a volt with fixed resistor 16 and variable resistor 17. In like manner the anode of diode 12 is biased positively by a small fraction of a volt with fixed resistor 18 and variable resistor 19. The mid-point connection between resistors 17 and 19 is returned to grounded input terminal 10 via arm 21 of potentiometer 15. Potentiometer 15 is connected across transformer secondary 8 and a variable-amplitude out-of-phase signal is developed between arm 21 and ground and fed forward in series with the log-diodes so as to cancel out the in-phase voltage developed across the diodes due to a linear resistance component present in each of the diodes. This concept for extending the amplitude range of a logarithmic circuit is the subject matter of the above-identified patent and further explanation will not be provided herein.

Where germanium diodes are used as the logarithmic impedance elements, it has been found advantageous to bias these diodes in the direction of current cut-off by a small fraction of a volt. This technique extends the dynamic range of the logarithmic characteristic.

Resistor 14 has a large resistance value and is connected in series with load impedance 11 and input terminal 9 as shown. The input signal source is thereby effectively made a constant-current generator and the potential drop across impedance 11 varies logarithmically as a function of the input signal voltage-amplitude. The resistance value of resistor 14 should be at least five times as large as the maximum resistance of the diodes which is reached at the lowest operating current to be used. The output voltage developed across impedance 11 is connected to output terminals 23 and 24 and is supplied to indicator 20 which may advantageously be a graph type recorder, an oscilloscope, a vacuum tube voltmeter or the like.

Figure 3:
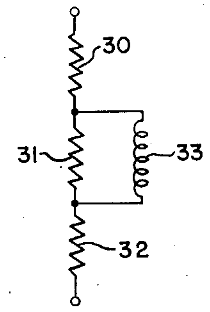
FIG. 3 is a schematic diagram showing the equivalent circuit of a germanium or silicon diode.

An equivalent circuit diagram of a silicon or germanium diode is shown in FIG. 3. The circuit includes a non-ohmic resistance 30, which varies logarithmically with current, high-frequency ohmic resistance 31, ohmic resistance 32 and an inductance 33 in parallel with resistance 31. It will be apparent to those skilled in the art that the impedance characteristic of this two-terminal network is frequency dependent with the reactance of the inductance increasing as a function of frequency. Since the non-ohmic resistance of the diode decreases logarithmically as current flow increases, the overall impedance characteristic of the diode is caused to depart from the desired logarithmic response at the high-amplitude high-frequency end of the transfer characteristic.

Figure 4:
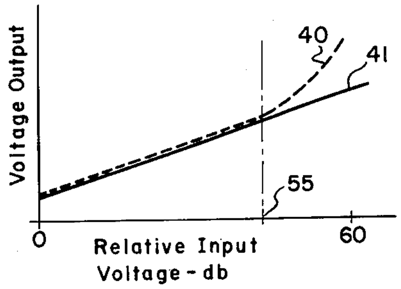
FIG. 4 is a graph showing the low-frequency and high-frequency transfer characteristics of a crystal diode logarithmic circuit without high-frequency compensation.

The dotted curve 40 in FIG. 4 represents a plot of the high-frequency response of the logarithmic circuit shown in FIG. 1 absent the desired high-frequency compensation. Relative input voltage is plotted in *db* and output voltage is plotted in volts. It will be noted that the transfer characteristic departs appreciably from the ideal logarithmic response represented by curve 41 at the high-amplitude end of the operating range. This departure is due to the inherent inductance in the crystal diodes described above.

Curve 41 in FIG. 4 shows the overall low-frequency and compensated high-frequency response of the improved circuit shown in FIG. 1. It will be noted that the overall transfer characteristic is substantially logarithmic (straight line) over an input range of 60 db (i.e., 1000 to 1).

In accordance with the invention, the desired high-amplitude high-frequency compensation is effected by zener diodes 50 and 51 connected back-to-back in series relationship with adjustable capacitor 52. The anode 53 of zener diode 50 is connected to arm 54 of potentiometer resistor 14 as shown. The zener diodes 50 and 51 function co-operatively as voltage-amplitude sensitive switches on alternate positive and negative half cycles effectively shunting the arm 54 of constant-current resistor 14 to ground potential through high-frequency compensating capacitor 52. The zener diodes are selected so as to provide the desired voltage-amplitude switching operation consistent with the absolute voltage-amplitude 55 at which curve 40 in FIG. 4 begins rising with respect to the desired logarithmic curve 41. This break point in the transfer characteristic may readily be determined by connecting a vacuum-tube voltmeter to the arm 54 with the arm set at approximately mid-point and measuring the high-frequency input-output characteristic over the operating amplitude range. The voltage-amplitude at which the departure is first detected is noted and the inverse-voltage breakdown for the zener diodes is based on this measurement. Experience has shown that the exact firing voltage for the zener diodes is not particularly critical and the potentiometer arm can be adjusted slightly to correct for variations in the zener diodes used. The value of capacitor 52 is chosen to compensate for the inherent inductive reactance in the crystal. The preferred alignment procedure will be described more fully hereafter in connection with FIG. 5.

It should be noted that the zener diodes 50 and 51, connected back-to-back as shown, present a relatively high impedance between arm 54 and ground for input signal amplitudes below zener breakdown on the positive and negative half cycles, respectively. For input signal amplitudes above the selected zener breakdown (i.e., those above 55 in FIG. 4), the zener diodes present an effective low resistance path to ground via capacitor 52. In accordance with this featured aspect of the invention, the desired high-amplitude high-frequency compensation is achieved, thereby extending the dynamic range of the logarithmic circuit.

Figure 2:
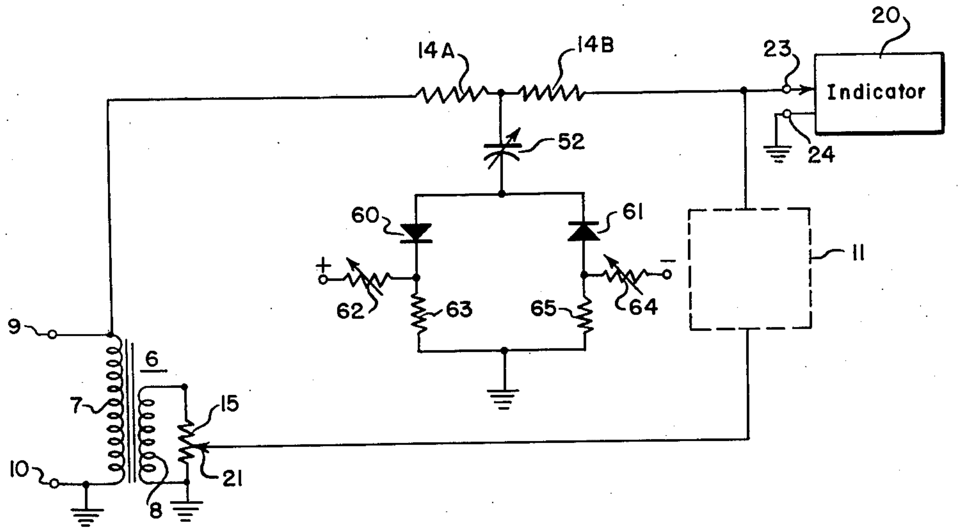
FIG. 2 is a schematic diagram showing an alternative arrangement to that of FIG. 1 wherein a pair of biased diodes are employed in conjunction with a capacitor to effect the desired non-linear high-frequency compensation.

An alternative non-linear high-frequency compensation circuit for an extended range logarithmic circuit is shown in FIG. 2. In this embodiment of the invention, conventional silicon or germanium diodes 60 and 61 are employed to effect the desired high-amplitude high-frequency compensation. In this embodiment of the invention, the input signal amplitude at which high-frequency compensation is introduced is established by the adjustment of cut-off bias for the two parallel-connected diodes. The cathode of diode 60 is biased positively by adjustable resistor 62 and small fixed resistor 63. In like manner the anode of diode 61 is biased to cut-off by adjustable resistor 64 and the small fixed resistor 65. High-frequency compensation for the log impedance 11 is introduced by capacitor 52 for all signal amplitudes exceeding the respective bias levels on the diodes 60 and 61. Although compensating capacitor 52 is shown returned to the mid-point of fixed resistors 14A and 14B, it will be apparent that these resistors could be replaced with the potentiometer as shown in FIG. 1. In both cases the total resistance 14 or 14A plus 14B is made large in order to make the input signal source appear as a constant-current generator.

Figure 5:
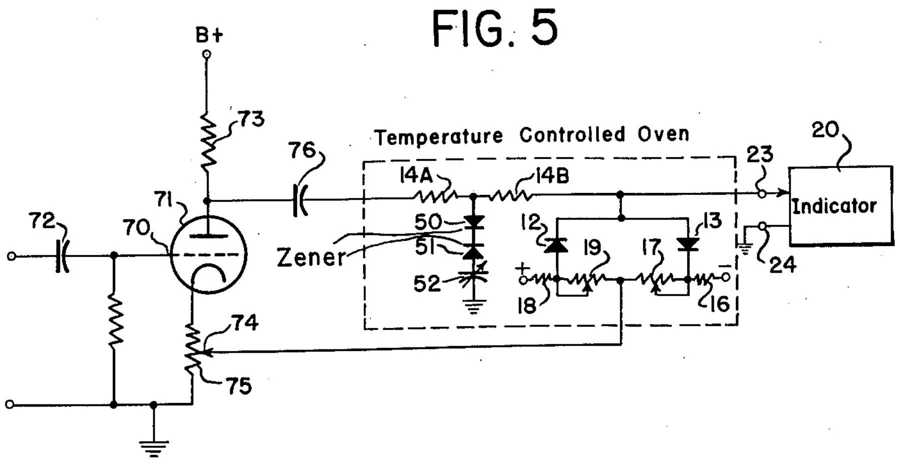
FIG. 5 is a schematic circuit diagram of a practical embodiment of the invention including means for temperature compensation of the non-linear impedance elements and the high-frequency compensation switching elements.

A schematic drawing of a temperature compensated logarithmic amplifier incorporating the frequency compensating features of this invention is shown in FIG. 5. The input signal is supplied to grid 70 of vacuum tube 71 via capacitor 72. Tube 71 functions as a conventional phase-splitter with the main signal for the logarithmic translation circuit being derived across plate resistor 73 and the forward-feed out-of-phase compensation signal being developed between the arm 74 of cathode potentiometer 75 and ground. Although amplifier tube 71 is shown as a triode, a pentode may be advantageously employed in order to obtain the optimum gain-bandwidth product. The tube should be selected to provide a linear output over the required amplitude range and the amplifier frequency response should be substantially flat from approximately 10 cycles to 100 kc. The A.C. signal developed across plate resistor 73 is coupled to constant-current resistors 14A and 14B with D.C. blocking capacitor 76. In a practical working embodiment of the invention the following components have been satisfactorily employed:

| | |
|---|---|
| Resistors 14A and 14B | 15,000 ohms. |
| Capacitor 52 | 65–340 mmf. |
| Zener diodes 50 and 51 | Transitron type SV15. |
| Diodes 12 and 13 | Transitron type S6G. |

For the above-described circuit configuration, vacuum tube 71 should be capable of developing a linear signal output of up to 75 volts R.M.S.

Since the impedance characteristic of the selected silicon diodes and zener diodes may vary from diode to diode, it is necessary to make initial adjustments of the several variable components before the logarithmic amplifier is used operationally. The recommended procedure for completing the various adjustments in order to achieve an optimum logarithmic transfer characteristic will now be described. A variable frequency test voltage source is connected to capacitor 72, and with the arm 74 of potentiometer 75 set at the ground end, bias potentiometers 17 and 19 are adjusted to provide the best logarithmic response at low and medium signal amplitudes. As mentioned above, the maximum amplitude of approximately 75 volts should be available at the input of resistor 14A for a conversion circuit that is to have an operating range of 60 db. By varying the amplitude of the input voltage in 10 db steps, a plot can be rapidly made of the overall transfer characteristic for the 60 db range. The initial test measurement should be made at a relatively low frequency, for example 1 kc. After the bias voltages have been properly adjusted for the log diodes 12 and 13 so as to afford good logarithmic response throughout the low to medium signal amplitude range, the input signal level should be adjusted to the high amplitude level and potentiometer arm 74 should then be adjusted to give the best logarithmic response at the 1 kc. frequency.

After the above tests have been completed, the high-frequency compensation should be adjusted by applying a high amplitude 100 kc. signal (or desired maximum upper frequency) to the input capacitor 72. The proper compensation is simply effected by adjusting capacitor 52 to such a value as to yield the desired output amplitude.

It should be noted that the desired high-frequency compensation can be achieved by employing a potentiometer in place of fixed resistors 14A and 14B (see FIG. 1). In this instance the required compensation is adjusted by moving the arm of this potentiometer while observing the output response with a high-amplitude high-frequency input signal. In order to achieve the flattest logarithmic response over the entire 60 db range, and in particular the high end of the frequency range, it is generally necessary to repeat the high-frequency adjustments for a frequency which is about 80 percent of the upper frequency limit. The necessary re-adjustments may be made in either R or C. In certain instances it may be found desirable to provide adjustments in both R and C in order to obtain optimum compensation.

As mentioned above and as shown in FIG. 5 the zener diodes and the logarithmic diodes are advantageously placed in a temperature controlled oven in order to obtain optimum circuit operating stability.

One of the outstanding features of the extended range logarithmic circuit provided by this invention resides in the fact that a minimum amount of operational maintenance and adjustment procedure is required after the circuit has been initially aligned as described above. The circuit is extremely stable, the bandwidth is excellent (many octaves) and the deviation from a desired logarithmic response is small over a wide amplitude range.

Several preferred embodiments of the invention have been described. It will be apparent to those skilled in the art that various changes and modifications may be made without departing from the scope of the invention as set forth in the following claims.

I claim:

1. A wide-band wave translation circuit having an extended logarithmic impedance transfer characteristic comprising input terminals for connecting a variable-amplitude variable-frequency input signal current to a non-linear element having a substantially logarithmic impedance characteristic over a portion of the desired current operating range and having an inherent inductive reactance which causes a departure in impedance from the desired logarithmic characteristic for high-ampltude high-frequency signal currents, circuit means connected in shunt relationship with said non-linear element provided to substantially compensate for the said departure in high-frequency impedance from the desired logarithmic characteristic, said means including a pair of diodes connected in series with a compensating capacitor, the said diodes having a high resistance for low amplitude input signals and a low resistance for high amplitude input signals, and a pair of output terminals connected to include the voltage produced across said non-linear element.

2. A wide-band wave translation circuit having an extended logarithmic impedance transfer characteristic comprising, a pair of input terminals for connecting a variable-amplitude variable-frequency input signal to a non-linear impedance element, said element having an inherent non-ohmic resistance which varies logarithmically as a function of the amplitude of signal current flow therethrough combined with a relatively small inherent inductance which causes the overall impedance of said element to rise above a desired logarithmic characteristic when high-amplitude high-frequency input signal currents are supplied thereto, circuit means connected in shunt relationship with said impedance element to substantially compensate for the undesired rise in high-frequency impedance of said element with high-amplitude input signals, said means including a pair of switching diodes connected in series with a high-frequency compensating capacitor, said diodes being operatively connected so as to conduct signal current only when high-amplitude input signals are supplied to said element, and output terminals connected to include the voltage produced across said non-linear impedance element.

3. A wide-band wave translation circuit in accordance with claim 2 characterized in that said switching diodes are zener diodes connected back-to-back in series relation.

4. A wide-band wave translation circuit in accordance with claim 2 characterized in that said switching diodes are of the solid state type which are connected in parallel with reverse polarity, and circuit means are provided for reverse biasing each diode below current cutoff by a predetermined voltage.

5. A wide-band wave translation circuit in accordance with claim 2 characterized in that said non-linear impedance element comprises a pair of silicon diodes connected in parallel and with reverse polarity, and circuit means are provided to bias each diode in the direction of static current conduction.

6. A wide-band wave translation circuit in accordance with claim 2 characterized in that said non-linear impedance element comprises a pair of germanium diodes connected in parallel and with reverse polarity, and circuit means are provided to bias each diode in the direction of static current cutoff.

7. A wide-band wave translation circuit having an extended logarithmic impedance transfer characteristic comprising, input terminals for connecting a variable-amplitude variable-frequency input signal current to a non-linear element having a substantially logarithmic impedance characteristic over a portion of the desired current operating range and having an inherent inductive reactance which causes a departure in impedance from the desired logarithmic characteristic for high-amplitude high-frequency signal currents, circuit means connected in shunt relationship with said non-linear element provided to substantially compensate for the said departure in high-frequency impedance from the desired logarithmic characteristic, said means including amplitude sensitive bi-lateral switching means connected in series with a high-frequency compensating capacitor, the said bi-lateral switching means being operatively connected so as to conduct signal current only when the input signal exceeds a predetermined amplitude, and a pair of output terminals connected to include the voltage produced across said non-linear element.

8. A wide-band wave translation circuit having an extended logarithmic impedance transfer characteristic comprising, a pair of input terminals adapted to receive a variable-amplitude variable-frequency signal voltage, a non-linear impedance element having an inherent non-ohmic resistance which varies logarithmically as a function of signal current flow therethrough combined with an undesired inherent inductance and an undesired linear ohmic resistance, a first ohmic resistor having a resistance value of at least five times the resistance of the said impedance element at a predetermined minimum operating current, means connected between said input terminals to produce a voltage inverted in phase with respect to the input signal voltage including means connected in series with the non-linear impedance element to which the phase-inverted voltage is applied, the latter voltage corresponding in amplitude to the in-phase voltage produced across the undesired ohmic resistance of the impedance element, the first resistor, the impedance element and the phase-inverting means being connected in series between the input terminals, circuit means connected in shunt with said impedance element to substantially compensate for the undesired inductive reactance in said impedance element when high-amplitude input signals are supplied to said circuit, said means including amplitude sensitive bi-lateral switching means connected in series with a high-frequency compensating capacitor, the said bilateral switching means being operatively connected so as to conduct signal current only when the input signal amplitude exceeds a predetermined value, and a pair of output terminals connected to include the voltage produced across said non-linear impedance element along with the said phase-inverted voltage.

9. A wide-band wave translation circuit in accordance with claim 8 characterized in that said first ohmic resistor is tapped at an intermediate point and the compensating circuit means is connected in shunt with said impedance element and a portion of the said tapped resistor.

10. The invention in accordance with claim 9 characterized in that the tap on said first ohmic resistor is adjustable.

11. The invention in accordance with claim 2 characterized in that said non-linear impedance element and the said pair of switching diodes are all mounted in a temperature controlled oven.

References Cited in the file of this patent

UNITED STATES PATENTS

| | | |
|---|---|---|
| 2,757,281 | Le Bel | July 31, 1956 |
| 2,861,239 | Gilbert | Nov. 18, 1958 |
| 2,972,064 | Hurlburt | Feb. 14, 1961 |